United States Patent Office 3,529,902
Patented Sept. 22, 1970

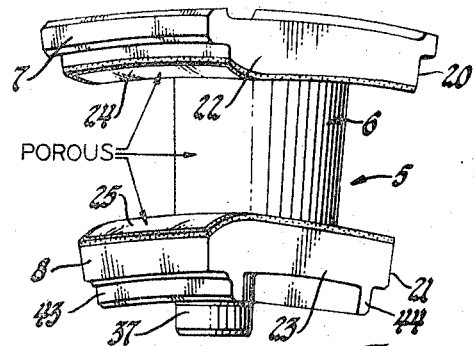
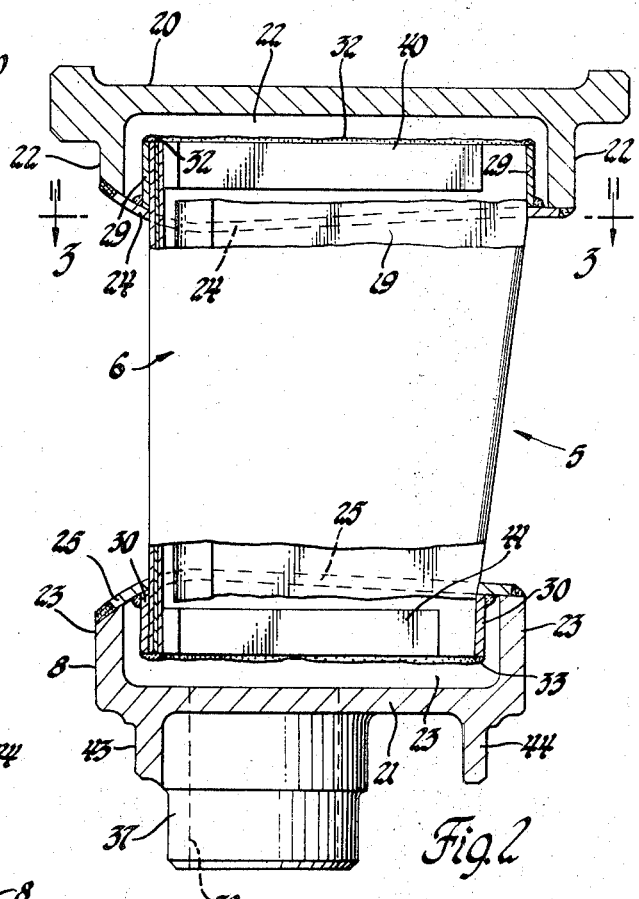
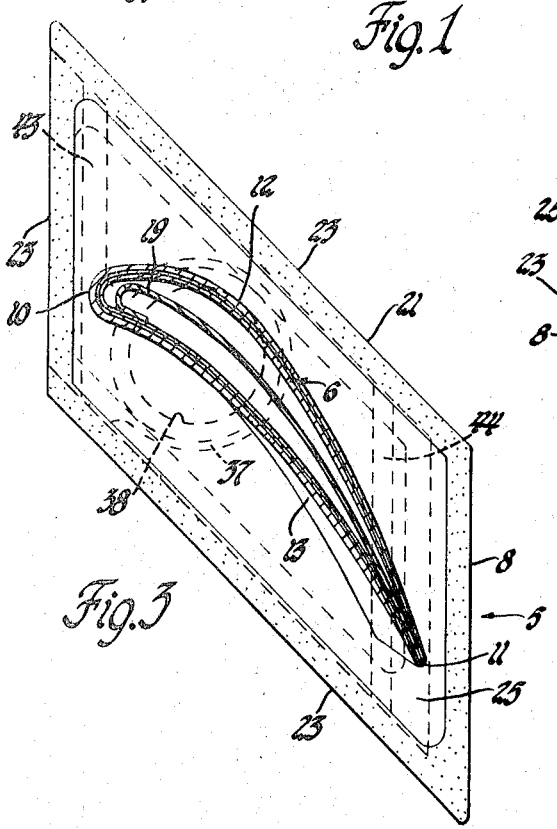
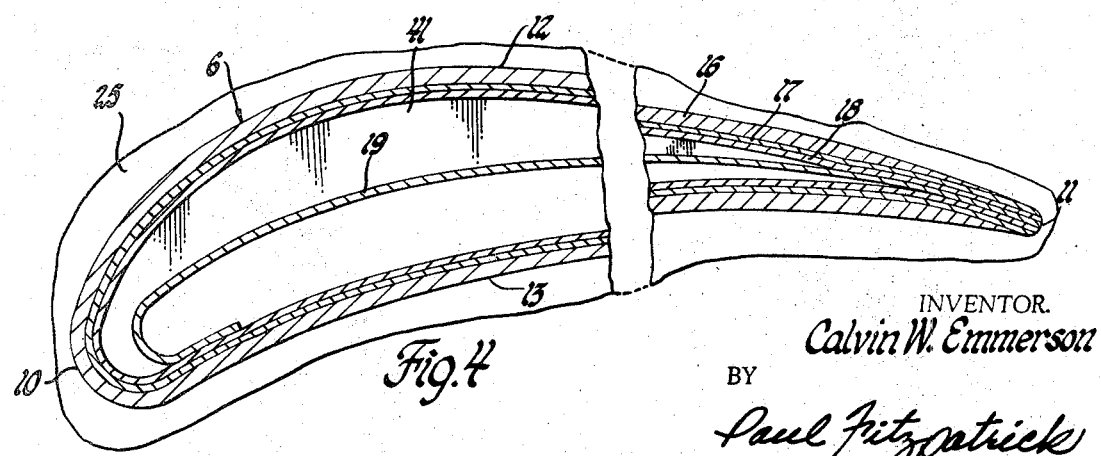
INVENTOR.
Calvin W. Emmerson
BY
Paul Fitzpatrick
ATTORNEY

3,529,902
TURBINE VANE
Calvin W. Emmerson, Mooresville, Ind., assignor to General Motors Corporation, Detroit, Mich., a corporation of Delaware
Filed May 22, 1968, Ser. No. 731,004
Int. Cl. F01d 9/02
U.S. Cl. 415—115                        9 Claims

ABSTRACT OF THE DISCLOSURE

A porous turbine vane adapted to be cooled by air supplied to the interior of the vane has an airfoil at least the surface of which is of a dispersion-strengthened nickel-chromium alloy containing, for example, thoria. The airfoil is associated with two shroud segments, one at each end, these being of hollow box-like form. The blade portion is welded to the shroud segments within the box-like body at a point removed from the portion of the blade which is exposed to the hot motive fluid.

My invention is directed to fluid-directing elements for high temperature turbomachinery and most particularly to turbine nozzle vanes or nozzle segments which have a fluid-directing airfoil element or blade portion made of or including a material, such as a dispersion-strengthened nickel-chromium alloy, which is adversely affected by welding. My invention provides for the production of such vanes by welding so that the blade and shroud portions are an integral structure without compromising the heat-resisting properties of the material. This is done by using hollow box-section shrouds or shroud segments into which the blade portion extends and within which the blade portion is welded to the shroud element.

The principal objects of my invention are to improve the operating characteristics, reliability, and endurance of high temperature turbomachines, to provide an improved turbine nozzle structure, to provide improved means for exploiting the high temperature resisting properties of dispersion-strengthened high temperature alloys in turbomachinery, to provide improved air-cooled turbine nozzles, and to provide a turbine nozzle structure which is readily manufactured and readily employed and replaced.

In its preferred embodiment, my invention is incorporated in a structure which is a development of or modification of that described in detail in my copending patent application Ser. No. 691,834 for Turbine Cooling, filed Dec. 19, 1967, of common ownership with this application. Preferably, in a turbine nozzle structure according to my invention, the nozzle is made up of segments, each of which may include a number of blades, but which preferably have only one blade for each segment. The nozzle is thus made up of a ring of such segments mounted on a suitable supporting structure. Each vane includes the fluid-directing blade and a shroud segment at each end of the blade. The shroud segments are hollow and box-like, preferably including a principal structural portion which defines the surfaces of the segments away from the motive fluid path and a facing which defines the surface past which the motive fluid moves. The ends of the blades extend through the facing into the interior of the shroud segments and the blade is fixed to the shroud segments by a weld within the hollow shroud structure at a point sufficiently spaced from the portion of the vane past which the motive fluid flows that the adverse effects of welding on the properties of the dispersion-strengthened material do not reach the part of the blade which is exposed to the motive fluid. The blades and shrouds have provision for cooling by air introduced into the structure under pressure which transpires through the blades and facings.

The nature of my invention and the advantages thereof will be clear to those skilled in the art from the succeeding detailed description of the preferred embodiment of the invention and the accompanying drawings thereof.

FIG. 1 is an axonometric view of a single vane turbine nozzle segment.

FIG. 2 is a sectional view of the same to a larger scale taken substantially on a plane containing the leading and trailing edges of the blade portion of the vane.

FIG. 3 is a transverse sectional view to a larger scale taken on the plane indicated by the line 3—3 in FIG. 2.

FIG. 4 is a transverse sectional view of the blade portion on a still larger scale than the preceding figures.

Referring to FIG. 1, the nozzle element or vane 5 comprises a blade or airfoil portion 6, an outer shroud segment 7, and an inner shroud segment 8. As shown most clearly in FIGS. 3 and 4, the blade is a hollow cambered airfoil of laminated sheet metal structure. Referring particularly to FIG. 4, the blade 6 has a rounded leading edge 10, a trailing edge 11, a convex face 12, and a concave 13. The material of the airfoil is folded at the leading edge and joined at the trailing edge to provide a closed tubular body. The material of the blade or airfoil is laminated, comprising an outer layer 16, an intermediate layer 17, and an inner layer 18. The outer layer is a dispersion-strengthened nickel-chromium alloy containing, for example, thoria. The intermediate and inner preferably are of high temperature resisting alloys but not dispersion-strengthened material. These layers are suitably bonded together to form a unitary structure.

The material of the layers is preferably of a controlled porous structure as described in my above-mentioned copending application and in U.S. Pat. application Ser. No. 526,207 of Bratkovich and Meginnis for Laminated Porous Metal, filed Feb. 9, 1966, of common ownership with this application. In view of the full description of such porous laminated metal in the prior applications, it is deemed unnecessary to describe it in this application. Besides, my vanes may be made of any suitable porous metal. Also, the structural principles which preserve the temperature resistance of the exposed dispersion-strengthened material may be employed with blade material which is not porous. The blade also includes a sheet metal internal baffle 19 which serves to direct cooling air within the blade as described in my above-mentioned copending application.

Referring now more particularly to FIGS. 2 and 3, the shroud segments 7 and 8 include cast bodies 20 and 21, of generally rhomboidal outline as shown clearly in FIG. 3. The outer shroud body 20 has an inwardly directed flange 22 adjacent the margins of the segments. The body 21 has a peripheral flange 23 directed toward the outer segment.

A facing 24 fixed to the outer shroud segment body and a facing 25 fixed to the inner shroud segment body define the boundaries of the motive fluid path through the nozzle. These facings are high temperature resistant sheet metal of controlled porosity and of lighter section than the body portions 20 and 21 of the shroud segments. The facings are welded at their margins to the edges of the flanges 22 and 23, as shown most clearly in FIG. 2.

Each of the facings 24 and 25 has an opening conforming to the cross section of the blade and each end of the blade extends through one of the facings into the hollow interior of the box-like shroud segment 7 or 8. A sleeve, pilot, or flange is welded to each facing and extends into the shroud segment. As shown most clearly in FIG. 2, the flange 29 extends into shroud segment 7 and flange 30 into shroud segment 8. These flanges preferably are of the same form as the cross section of the blades so that they fit around the exterior of the blade across both the leading and trailing edges and both faces of the blade. However, it is not essential that these flanges extend over the entire faces of the blade within the shroud segments. The flanges 29 and 30 are conterminous with the blade 6, and a weld is performed at the abutting edges of these parts so that the blade is welded to flange 29 at 32 and to flange 30 at 33. As appears clearly from the drawings, this weld is very substantially spaced from the portion of the blade between the facings 24, 25 which is exposed to the motive fluid, the distance being greater than the distance through which the weld at 32, 33 seriously affects the desirable heat-resisting properties of the dispersion-strengthened alloy.

A boss 37 extending from the inner shroud segment 8 defines an air entrance hole 38 for cooling air into segment 8, from which it flows into the blade between baffle 19 and the concave face 13. Plugs 40 and 41 close the space between the baffle and the remainder of the blade wall at the respective ends of the blade. The cooling air introduced through the hole 38 is directed to the inside of the concave face of the blade and then through the baffle as described in my above-mentioned copending application to the leading edge and convex face of the blade.

The boss 37 also may serve as part of means for locating and supporting the blade in the supporting structure (not illustrated). As illustrated, the inner shroud segment 8 has inwardly directed flanges 43 and 44 which also are functional in mounting the nozzle segments in the turbine.

In the interest of brevity, no attempt is made to describe a complete nozzle made up of segments of the sort described here, since this is not material to the present invention. In addition to my above-mentioned prior patent application, there are many patents showing segmented nozzle structures including Boyd et al. U.S. Pat. No. 2,654,566 for Turbine Nozzle Guide Vane Construction, issued Oct. 6, 1953 and Collman et al. U.S. Pat. No. 2,960,306 for Turbine, issued Nov. 15, 1960. It should be noted that it is possible to mount nozzle blades according to my invention in completely annular shrouds if desired.

It will be clear to those skilled in the art from the foregoing description of the preferred embodiment of my invention that it provides a rigid unitary nozzle segment made up of parts each suitable to its function, the parts being principally the blade, the shroud segment bodies, and the facings. The arrangement makes it feasible to use a welded structure in such a way as not to compromise the high temperature resisting properties of the dispersion-strengthened alloys.

The invention is applicable to cantilevered vanes; that is, those supported at only one end and free at the other.

The fabrication of the blade should be apparent from the description of the structure, but it may be outlined briefly. The flange portions 29 and 30 of the facings are welded to the preformed facings. Then, the blade is welded to these assemblies. Finally, the bodies 20 and 21 are welded to the facings.

In operation, the cooling air enters shroud segment 8 and flows through the blade and also to shroud segment 7. Air transpires through the facings 24 and 25 and through the blade generally as described in my above-mentioned copending application. The cooling air circulation, and the remoteness of welds 32 and 33 from the blade surfaces exposed to the motive fluid, keeps the blade cool enough at these welds to tolerate the depreciation of the dispersion-strengthened material by the welding.

The word shroud, as used in the claims, is intended to refer to an entire shroud forming a complete circle and to any shorter arc or segment of a shroud.

The detailed description of the preferred embodiment of the invention for the purpose of explaining the principles thereof should not be considered as limiting or restricting the invention, since many modifications may be made by the exercise of skill in the art within the scope of the invention.

I claim:

1. A fluid-directing element for a high-temperature turbomachine comprising, in combination, a hollow box-section nozzle shroud; at least one motive fluid directing blade extending from and fixed to the shroud, the blade including a heat-resistant material having its heat resistance adversely affected by welding; the blade having an end extending into the interior of the shroud and welded to the shroud within the box section so that the shroud shields the welded end of the blade from the turbine motive fluid; the surfaces of the blade and of the shroud directly exposed to the motive fluid being of a porous structure providing for transpiration cooling; and means for introducing a cooling fluid into the shroud and blade for discharge through the said porous surfaces, the cooled shroud shielding the weld between the blade and shroud from the motive fluid and maintaining the material adjacent the weld substantially cooler than the motive fluid.

2. An element as recited in claim 1 in which the said heat-resistant material is a dispersion-strengthened nickel-chromium alloy.

3. An element as recited in claim 1 in which the shroud includes a body defining a recess to receive the end of the blade, a facing on the body having a surface effective to provide a boundary of the fluid passage, the facing covering the said recess and having an opening conforming to the cross-section of the blade, the end of the blade extending through the said opening into the said recess, a flange on the facing extending into the recess, and a welded connection between the facing flange and the blade within the recess spaced from the said surface of the facing.

4. An element as recited in claim 1 defining a segment of a turbine nozzle, in combination with other segments as recited in claim 1 to define a turbine nozzle.

5. A fluid-directing element for a high-temperature turbine nozzle comprising, in combination, two hollow box-section nozzle shrouds, a motive fluid directing blade extending between and fixed to the shrouds, the blade including a heat-resistant material having its heat resistance adversely affected by welding; the end of the blade extending into the interiors of the shrouds and being welded to the shrouds within the shrouds so that the shrouds shield the welded ends of the blade from the turbine motive fluid; and means for introducing a cooling fluid into the shrouds and blade, the surfaces of the shrouds and the blade directly exposed to the turbine motive fluid being a porous structure providing for transpiration of the cooling fluid, the cooled shrouds shielding the welds between the blade and shroud from the motive fluid and maintaining the material adjacent the weld substantially cooler than the motive fluid.

6. An element as recited in claim 5 in which the said heat-resistant material is a dispersion-strengthened nickel-chromium alloy.

7. A fluid-directing element for a high-temperature turbomachine comprising, in combination, a first body; a second body; at least one motive fluid directing blade extending between and fixed to the said bodies, each body having a flange extending toward the other body defining a recess; a facing on each body having a surface effective to provide a boundary of the fluid passage at each end of the vane, each facing covering a said recess and having an opening conforming to the cross-section of the blade; the ends of the blade extending through the said openings into the said recess; a flange on each facing extending into the recess; and a welded connection between the facing flange and the blade within the recess spaced from the said surface of the facing; the said bodies being of such form as to be suitable for disposition in abutting annular array so as to define the inner and outer shrouds, respectively, of a segmented turbine nozzle, the cooled bodies shielding the welds between the blade and the facing flanges from the motive fluid and maintaining the material adjacent the welds substantially cooler than the motive fluid.

8. An element as recited in claim 7 in which the blade includes a material the resistance of which to high temperature motive fluid is deteriorated by welds adjacent to the welds.

9. An element as recited in claim 8 in which the said material is a dispersion-strengthened nickel-chromium alloy.

References Cited

UNITED STATES PATENTS

| | | |
|---|---|---|
| 2,681,788 | 6/1954 | Wosika. |
| 2,774,566 | 12/1956 | Richardson. |
| 2,924,425 | 2/1960 | Cutler. |
| 2,956,773 | 10/1960 | French. |
| 3,269,700 | 8/1966 | Shainess. |
| 3,402,914 | 9/1968 | Kump et al. |

EVERETTE A. POWELL, Jr., Primary Examiner

U.S. Cl. X.R.

416—95, 224, 231

PO-1050
(5/69)

UNITED STATES PATENT OFFICE
CERTIFICATE OF CORRECTION

Patent No. 3,529,902          Dated September 22, 1970

Inventor(s) Calvin W. Emmerson

It is certified that error appears in the above-identified patent and that said Letters Patent are hereby corrected as shown below:

Column 2, line 27, after "concave" insert -- face --.

Column 2, line 34, after "inner" insert -- layers --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents